N. T. BROWN.
DIRECTION INDICATOR.
APPLICATION FILED MAY 4, 1920.
1,395,088.
Patented Oct. 25, 1921.
2 SHEETS—SHEET 1.
Fig.1.
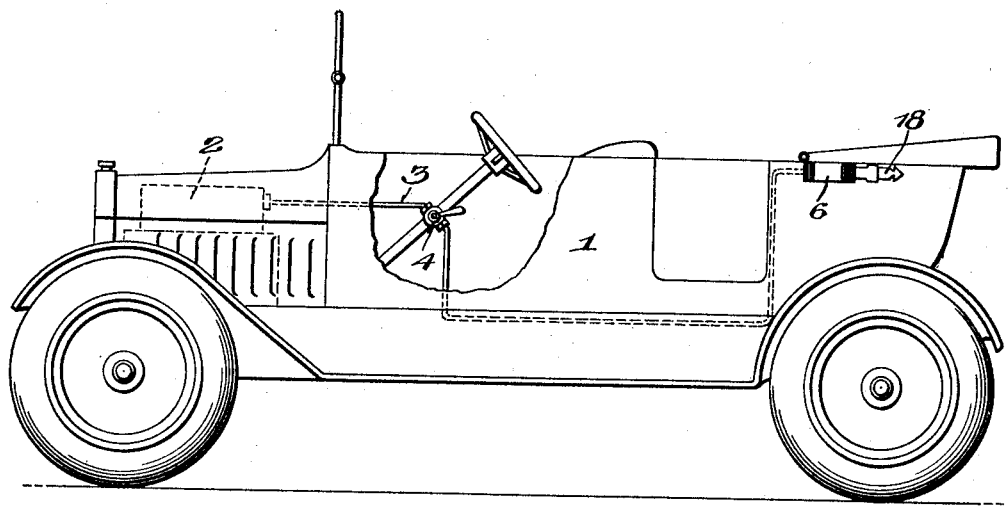
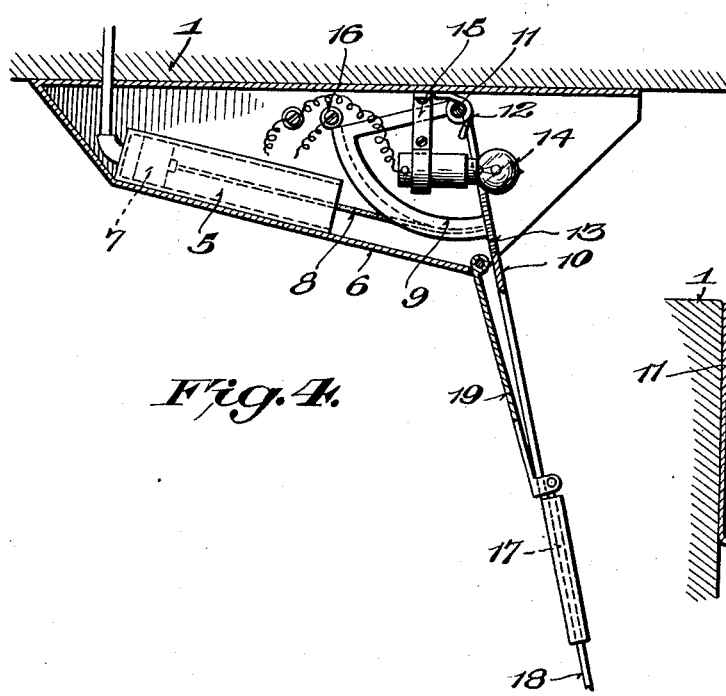
Fig.4.
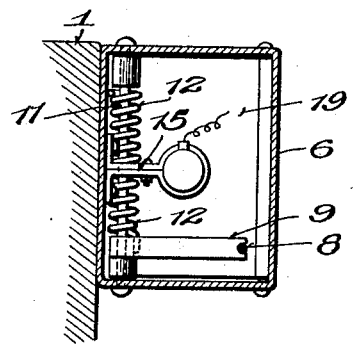
Fig.5.
Witness
Chas. L. Griesbauer
Inventor
Newman T. Brown,
By N. C. M°Cartney
Attorney

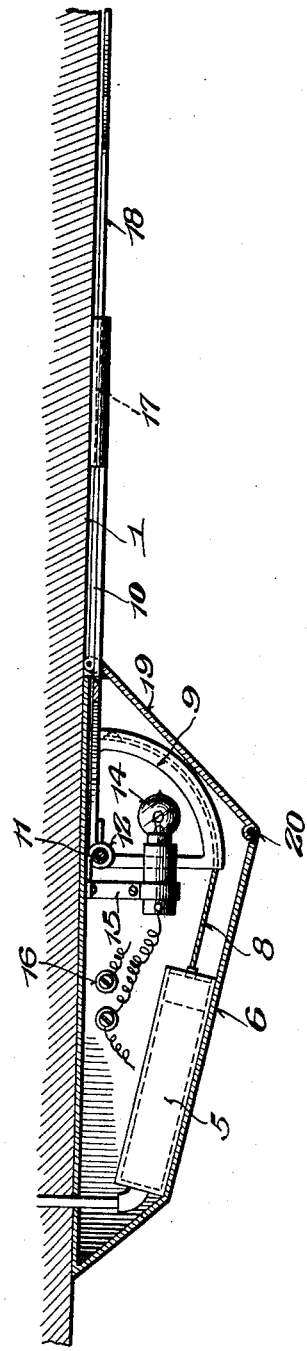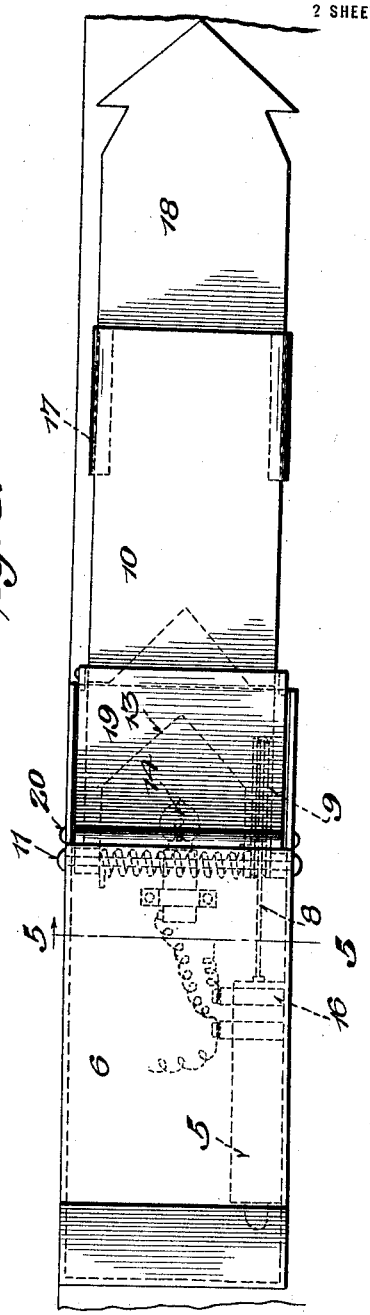

UNITED STATES PATENT OFFICE.

NEWMAN T. BROWN, OF SEATTLE, WASHINGTON, ASSIGNOR TO CHARLES A. SPIRK, OF SEATTLE, WASHINGTON.

DIRECTION-INDICATOR.

1,395,088.   Specification of Letters Patent.   Patented Oct. 25, 1921.

Application filed May 4, 1920.   Serial No. 378,928.

*To all whom it may concern:*

Be it known that I, NEWMAN T. BROWN, a citizen of the United States, residing at Seattle, in the county of King and State of Washington, have invented certain new and useful Improvements in Direction-Indicators; and I do declare the following to be a full, clear, and exact description of the invention, such as will enable others skilled in the art to which it appertains to make and use the same.

This invention relates to certain new and useful improvements in direction indicators for motor vehicles, and has for its primary object to provide an indicator or signal which is operable by the motor.

Further, the invention resides in a suction-operated device arranged to be connected to an internal combustion engine and having a control within easy reach of the operator or chauffeur, whereby the device may be opened into communication with the engine intake and be actuated by the suction thereof to cause a display of the indicator from the rear to thereby signal those to the rear the intention of the chauffeur.

Still further, the invention aims to provide a signal of novel construction, having a housing or chamber for an illuminating lamp and for also arresting the outward movement of the signal to hold same in display position.

Other and further objects will be later set forth and manifested in the course of the following description.

In the drawings:

Figure 1, is a side view of an automobile equipped with the present invention;

Fig. 2, is a horizontal section through the indicator casing elucidating the construction and showing the parts in their operative position;

Fig. 3, is a side elevation of the device;

Fig. 4, is a view similar to Fig. 2, depicting the invention as being operative; and Fig. 5, is a vertical transverse section on line 5—5 of Fig. 3.

The indicator can be mounted at any point on the motor vehicle 1, where it may be seen by those approaching and following, the present disclosure depicting the invention attached to the side of the body and connected to the engine 2, by means of a pipe or conduit 3, which has a control valve 4, interposed therein.

This valve may be arranged at any point desired within convenient reach of the operator, and when opened, establishes communication between the intake manifold of the engine and the indicator cylinder 5.

A casing 6, is secured to the side of the vehicle body and houses the cylinder 5. A piston 7, is slidably disposed in the cylinder and has a flexible cable 8, passing around and secured to the forward end of a segment 9 whereby the cable will have an even pull in all positions of the arm said segment being carried by a vertical post 11 about which a coiled spring 12 is wound to normally urge the segment forwardly. An indicator arm 10 is pivoted to swing on the vertical pin 11, and when the cylinder is opened to the engine intake, the piston will be drawn inwardly and thereby effect swinging of the arm to extend laterally from the vehicle. When valve 4, is closed the spring 12 will act to return the arm in against the vehicle.

The arm is secured integrally or otherwise to the forward edge of the segment and is formed with an opening 13 through which the lamp 14 is projected as the arm swings outward, said lamp being supported from the casing by a fixed bracket 15. The circuit through the lamp is closed by the segment engaging the contact 16 thereby lighting the lamp to illuminate the extended arm. The signal arm consists of an outer section and an inner section, the latter having edge channels 17 slidably receiving the outer section in a telescopic manner. The inner end of the outer arm section 18 is pivoted to the free end of a cover or closure 19 for the casing said cover being hinged to the outer side of the casing, as indicated at 20. The function of the cover is two-fold, 1st, to keep dust and dirt out of the casing and 2nd, to automatically extend the arm by and during the outward swinging thereof. Thus, in operation the outer arm section and cover move with increasing angular relation in an outward direction until the two parts lie almost at an angle of 180° apart.

By simply opening the valve 4 the arm will be moved outwardly to its operative position in which the lamp will shine on the rear face of the arms. The operation is entirely automatic, except for the control means, which is within ready grasp of the operator, and is smooth and quiet throughout its movements. The suction or pneumatic control affords an easy cushioning action and a certain and positive operation.

What is claimed is:

1. In a vehicle direction indicator, a casing formed to be secured at one side to a side of the vehicle and having an open rear end having a cylinder and a piston therein, a signal member pivoted at one end rearwardly of the cylinder and adjacent the rear end of the casing, means to hold the member in retracted position, means to actuate the piston, and a device connected to the member and to the piston whereby upon operation of the latter the member will be moved to extend across the rear end of the casing.

2. In a direction indicator, a casing extending longitudinally of the vehicle, a signal arm pivoted adjacent the rear end of the casing and normally disposed longitudinally of the vehicle and extending beyond the rear end of the casing, and means to actuate the arm to move same outwardly across the rear end of the casing and at substantially right angles to the plane of the casing.

3. In a direction indicator, a casing, a stationary source of light in the casing, a signal arm movably mounted to extend outwardly from the rear end of the casing and at substantially right angles to the plane of the casing so that rays from the light will strike the rear face of the arm when the latter is in display position and means to actuate the arm.

4. In a direction indicator, a casing, an extensible indicator arm pivoted at its inner end to the casing and projecting beyond the rear end of the casing, and a hinged closure for the rear end of the casing connected at its outer edge to the extensible section of the arm for extending the same and simultaneously opening the closure upon swinging the arm to its indicating position.

5. In a direction indicator, a casing, an extensible indicator arm pivoted at its inner end to the casing, a hinged closure for the casing connected at its outer edge to the extensible section of the arm for extending the same and simultaneously opening the closure upon swinging the arm to its indicating position, and stationary illuminating means within the casing normally forwardly of the arm, said arm movable past the illuminating means to its indicating position whereby to illuminate the back face thereof.

6. In a direction indicator, a casing, an extensible indicator arm pivoted at its inner end to the casing, a hinged closure for the casing connected at its outer edge to the extensible section of the arm for extending the same and simultaneously opening the closure upon swinging the arm to its indicating position, and means within the casing for moving the arm to its operative position including a cylinder, a piston therein, and a connection between the arm and piston.

7. In a direction indicator, a casing having an open rear end, an indicator arm movably connected to the casing, illuminating means rigidly mounted in the casing adjacent said rear end, a closure for the rear casing end connected to the arm, and means to move the arm to display position, said arm being formed so that when same is in display position the illuminating means will project across the arm to illuminate the rear face of the latter.

8. In a direction indicator, a casing having an inclined rear end, an extensible indicator arm pivoted at its inner end to the casing and extending outwardly beyond the rear end of the casing, a hinged closure for the rear end of the casing connected at its outer edge to the extensible section of the arm for extending the same and simultaneously opening the closure upon swinging the arm to its indicating position, and means for operating the arm comprising a cylinder within the casing connected to the engine, and a piston operable in the cylinder and connected to the arm for actuating the same.

9. In a direction indicator, a casing, a cylinder having a piston in the casing, a signal arm pivoted at its inner end adjacent the rear end of the casing and extending outwardly therefrom, and a connection between the piston and the arm whereby upon movement of the piston in one direction the arm will be moved across the rear end of the casing.

10. In a vehicle direction indicator, a casing formed to be secured at one side to a side of the vehicle and having an open rear end, a signal arm pivoted adjacent the rear end of the casing and extending outwardly therefrom, a closure for the rear end of the casing pivoted at its outer end to the front side of the rear end of the casing and connected at its rear end to the arm, and means to operate the arm to move same to extend across said rear end of the casing when in display position.

In testimony whereof I affix my signature in presence of two witnesses.

NEWMAN T. BROWN.

Witnesses:
CHARLES A. SPIRK,
ALBERT McCLELLAN.